United States Patent [19]

Carolfi

[11] Patent Number: 5,215,369
[45] Date of Patent: Jun. 1, 1993

[54] FRONT SECTION OF A MOTOR VEHICLE WITH FOG LIGHTING

[76] Inventor: Gianni Carolfi, Via Settevenepalo Km. 6, 400-00069 Trevignano (Roma), Italy

[21] Appl. No.: 827,027

[22] Filed: Jan. 27, 1992

[30] Foreign Application Priority Data

Jun. 13, 1991 [IT] Italy .............................. 91/000125[U]

[51] Int. Cl.$^5$ ................................................ B60Q 1/20
[52] U.S. Cl. ........................................ 362/83; 362/80; 362/243; 362/359
[58] Field of Search ..................... 362/61, 80, 83, 359, 362/243, 231

[56] References Cited

U.S. PATENT DOCUMENTS

| | | | |
|---|---|---|---|
| 1,328,692 | 1/1920 | Richard | 362/83 |
| 1,596,473 | 8/1926 | Whittier | 362/61 X |
| 1,991,866 | 2/1935 | Rich | 362/80 |
| 2,221,054 | 11/1940 | Luker | 362/80 |

FOREIGN PATENT DOCUMENTS

| | | |
|---|---|---|
| 515735 | 1/1931 | Fed. Rep. of Germany . |
| 995205 | 11/1951 | France . |
| 1143826 | 10/1957 | France . |

*Primary Examiner*—Stephen F. Husar
*Attorney, Agent, or Firm*—Beveridge, DeGrandi, Weilacher & Young

[57] ABSTRACT

A front section of a motor vehicle includes a fog light system with indirect lighting. The indirect lighting improves an operator's vision in fog and is obtained by projecting the beams of light of the front fog lights so that they are oriented in such a way as to leave a zone not directly lit immediately ahead of the motor vehicle. A projection of light beams solely outwardly at an angle of 45°, 60° or 90° with respect to an axis extending in the direction of travel and through the projecting fog light is preferred. The fog light can be positioned such that the body of a vehicle itself acts to prevent any inwardly directing light. Alternatively, a tubular shield with the inside portion axially extending further than the outside portion can be relied upon to block inwardly directed light. A similar tubular shield can be relied upon with regard to fog lights in spaced position on the top of a vehicle (above the windshield on the roof of the vehicle) with the tubular shields being positioned to prevent downwardly directing beams of light while allowing for upwardly projected beams at angles which range up to 45°, 60° and 90°. The beam of light originates at an axis which is parallel with the longitudinal axis of the vehicle and intersects the projecting fog light.

25 Claims, 3 Drawing Sheets

FRONT SECTION OF A MOTOR VEHICLE WITH FOG LIGHTING

This invention relates to a front section of a motor vehicle with fog lighting. More particularly, this invention concerns a fog light system with indirect lighting, wherein the beams projected by the specially provided lamps are so oriented as to supply a better visibility through the fog.

The fog lights usually employed in motor vehicles, as is well know, are, normally, a couple of white or colored low beam headlights, and they aim exclusively at penetrating or piercing the mist which, being between the motor vehicle driver and the route, limits the visibility and hides possible obstacles from the driver's view.

Such fog lights differ from one another by the color or the type of lamp employed, but they all have the common feature of directing the light beam before the vehicle towards the route thereof, thus giving rise to an opalescent wall made of the illuminated fog in front of the driver.

As fog is made of tiny droplets of water suspended in the air, when a direct light beam, e.g., from the headlights of a motor vehicle, impinges on them, said droplets reflect the light, thus giving rise to an illuminated barrier in front of the driver, which barrier is transverse to the route of the motor vehicle. Such barrier prevents the driver from viewing beyond it in order to ascertain the presence of any obstacle on the road.

As a consequence, it is right the attempt at lighting the route ahead of the vehicle that makes less visible, in the presence of fog, the obstacles immediately close to the motor vehicle itself.

Accordingly, an object of the present invention is to provide a fog light system that overcomes the drawback mentioned above, thus making the ride of vehicles under atmospheric conditions of reduced visibility safer.

According to the invention, the effect of reflection created by the lit fog is exploited instead of trying to penetrate the fog by directly lighting it. Such result is obtained by operating in such a way that the reflecting barrier is located on the sides of the road instead of being transverse of to the road itself.

If the light projected by the fog lights, instead of being oriented ahead and centrally with respect to the motor vehicle is oriented ahead but diagonally towards the outside of the motor vehicle, thus leaving a front central zone not directly struck by the light, said central zone is indirectly lit by the fog which is directly struck by the fog lights beams. The lit fog thus forms a kind of lit corridor on both sides of said central zones.

Accordingly, the present invention specifically provides a front section of a motor vehicle comprising two groups of headlights, each comprising at least a fog light, characterized in that two of said fog lights are located close to the body sides of the motor vehicle or right within said body sides, and in that the beams projected by each one of said two fog lights form, on a plane parallel to the ground and passing through the respective light sources, angles comprised between 0° and 90° with the direction of the longitudinal axis of the motor vehicle, open towards the outside with respect to such central axis.

Preferably, said beams form angles between 0° and 60° with the direction of said axis, in order to comply, e.g., with the Italian rules of the road, according to which the maximum angle of the fog lights beams towards the outside with respect to the longitudinal axis of the motor vehicle is 60°.

The position of the fog lights close to the body sides of the motor vehicle or right on the body sides themselves is to be understood as comprising all arrangements wherein said fog lights are sufficiently spaced from the central axis of the motor vehicle as to allow, possibly with the help of shielding elements, the formation of a corridor not directly lit in the central zone in front of the vehicle. In particular, e.g., if suitably spaced and shielded, the fog lights according to the invention can also be arranged in front of the vehicle.

According to a specific embodiment of this invention, the fog lights are integrated within the shape of the motor vehicle, and they preferably are included within the body side of the same, at a position close to the front mudguards. In that case, the beams projected by each one of the two projectors are limited towards the direction of the longitudinal axis of the motor vehicle by the shielding effect of the motor vehicle body itself.

Alternatively, according to the invention, the fog lights are outside the shape of the motor vehicle and, in order to obtain the absence of direct lighting in the central corridor in front of the vehicle, each light source is provided with a shielding element.

In particular, such shielding element can consist in an opaque tubular shield placed around each one of said fog lights, such shield being of higher axial length in the portion facing the longitudinal axis of the vehicle, whereas the portion of shorter axial length is placed towards the outside with respect to said axis. According to the simplest embodiment of this kind, said shield has the shape of an obliquely cut hollow cylinder.

It is to be remarked that, if the rules of the road did not set a limit to the height from the ground allowed for the fog lights (said height being, in Italy, between 0.25 and 1.10 m) fog lights could also be advantageously provided, according to the invention, on top of motor vehicles.

In this case, in order to cooperate in creating the above mentioned lit corridor around a central zone which is not directly illuminated, the beams projected by each said additional lights should form, on a plane orthogonal to the ground, parallel to the longitudinal axis of the vehicle and passing through the relevant light source, a maximum angle of 90°, facing upwards with respect to the vehicle. As a matter of fact, there should be obtained a lit zone above the vehicle, which zone is oriented, obviously, in the direction of the route, and has as its lower limit, preferably, the horizontal plane passing through the light source.

As this invention can be carried out also by suitably modifying the motor vehicles already in use, i.e., by employing separately made fog lights of the kind described above, the invention also concerns a fog light to be assembled on a motor vehicle outside the shape thereof, such fog light being characterized in that it is surrounded by an opaque tubular shield of higher axial length at a point, and of lesser axial length at another point which is diametrically opposite to the first one.

As pointed out before, the tubular shield can merely have the shape of an obliquely cut hollow cylinder.

The invention will be disclosed below by way of non limitative examples, which represent some specific embodiments thereof. Said embodiments are illustrated in the enclosed drawings, wherein.

Figure 1:
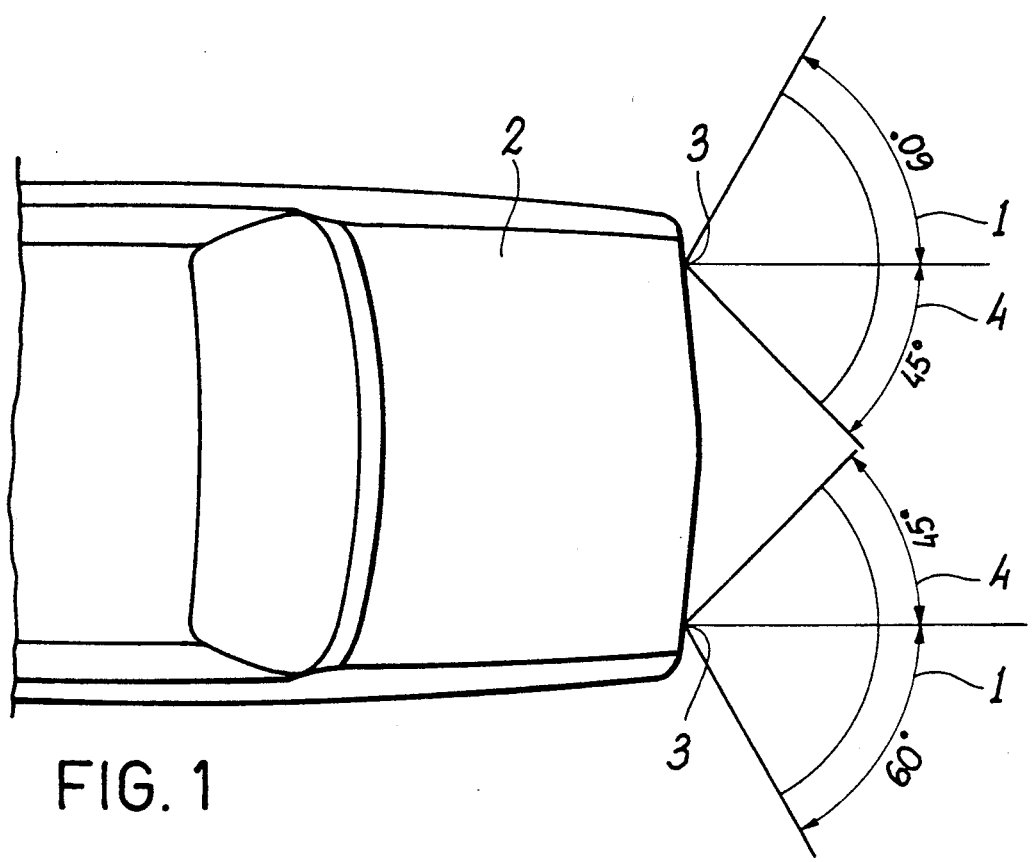
FIG. 1 shows the maximum geometrical visibility angles and the orientation of the fog lights according to the Italian rules of the road.

As shown in FIG. 1, the Italian rules of the road set out that the beams projected by the fog lights cover a maximum angle 1 of 60° towards the outside, starting from the axis parallel to the axis of the motor vehicle 2 which passes through the respective light source 3. The corresponding angle 4 towards the inner side is of 45°.

Figure 2:
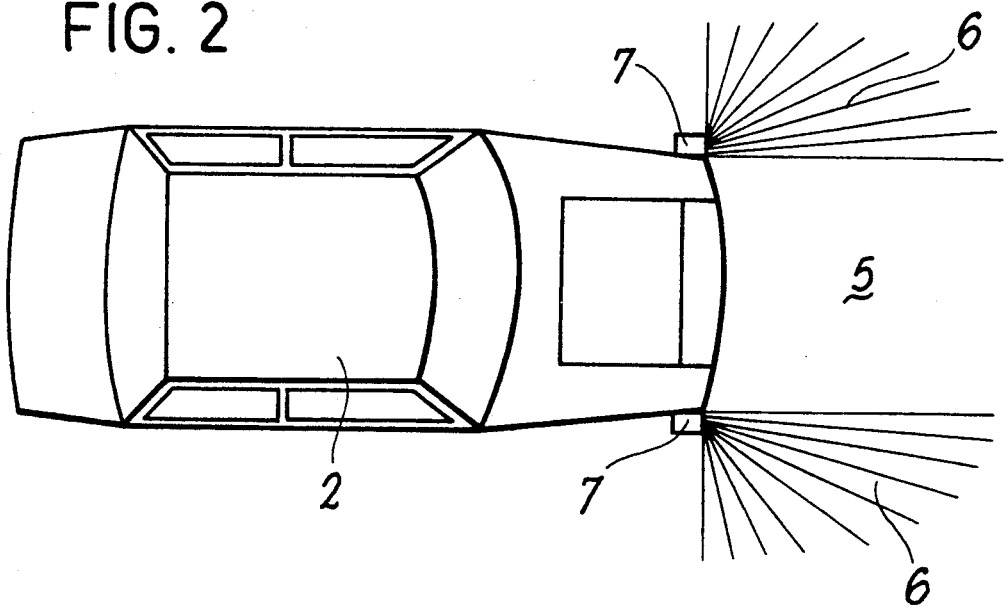
FIG. 2 shows a schematic view of the beams projected by the fog lights of a motor vehicle according one embodiment of the invention.

According to the present invention, there is provided a fog light system wherein the two angles 4 of 45° towards the central axis of the motor vehicle are completely excluded, so as to obtain a zone 5 not directly lit in front of the motor vehicle. FIG. 2 shows schematically the orientation of the beams 6 of the fog lights 7 according to the invention.

Figure 3:
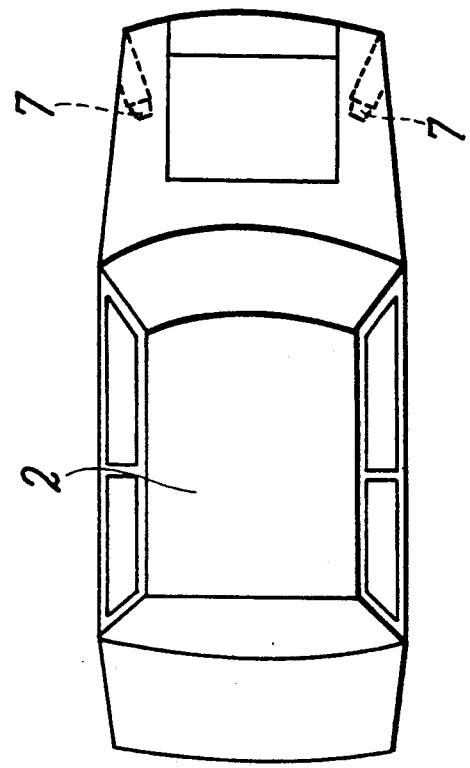
FIG. 3 shows schematically the position of fog lights according to the invention in the case in which they are integrated in the shape of a motor vehicle.

In order to obtain such distribution, the embodiment shown in FIG. 3 exploits the shielding effect provided by the body itself of the motor vehicle 2. As the fog lights 7 are embedded in the shape of the vehicle in a lateral position, the beams projected are limited by the edge of the motor vehicle body, and the zone immediately in front of the motor vehicle 2 is not lit. Preferably, the projected beam is shielded on the inside sufficiently so as to form angles extending outwardly from an axis extending parallel with the vehicle's longitudinal axis of between 0° to 90° or, more preferably, between 0° to 60° or between 0° to 45°.

The two light cones projected by the fog lights have in that case a central axis forming an acute angle with the longitudinal axis of the motor vehicle 2, so that the maximum light intensity is directed forward in an oblique direction with respect to the route of the motor vehicle 2.

It is to be remarked that such arrangement, contrarily to what might be expected, does not result in dazzling problems to the driver of a motor vehicle proceeding from the opposite direction, because the beam strikes the driver of the opposite motor vehicle only when this is very close and for a very short time, just as a consequence of the fact that such beam is not directed straight forward.

In any case, when a driver is at such a distance from the oncoming motor vehicle that he may see the lights of such vehicle, he can employ the usual passing beams thereby switching off for a moment the fog lights according to the invention, as is usually done on extraurban roads, when employing high beams.

It is also to be remarked that the power of the fog lights according to this invention is not higher than that set forth in the rules of the road. Said power is preferably equal to the maximum one allowed by the rules of the road in force in the various Countries.

On the basis of the tests carried out, it has been found that the fog lights with indirect lighting according to this invention are increasingly efficient in enhancing the visibility on increasing the fog thickness and on reducing the outer lighting.

Figure 4:
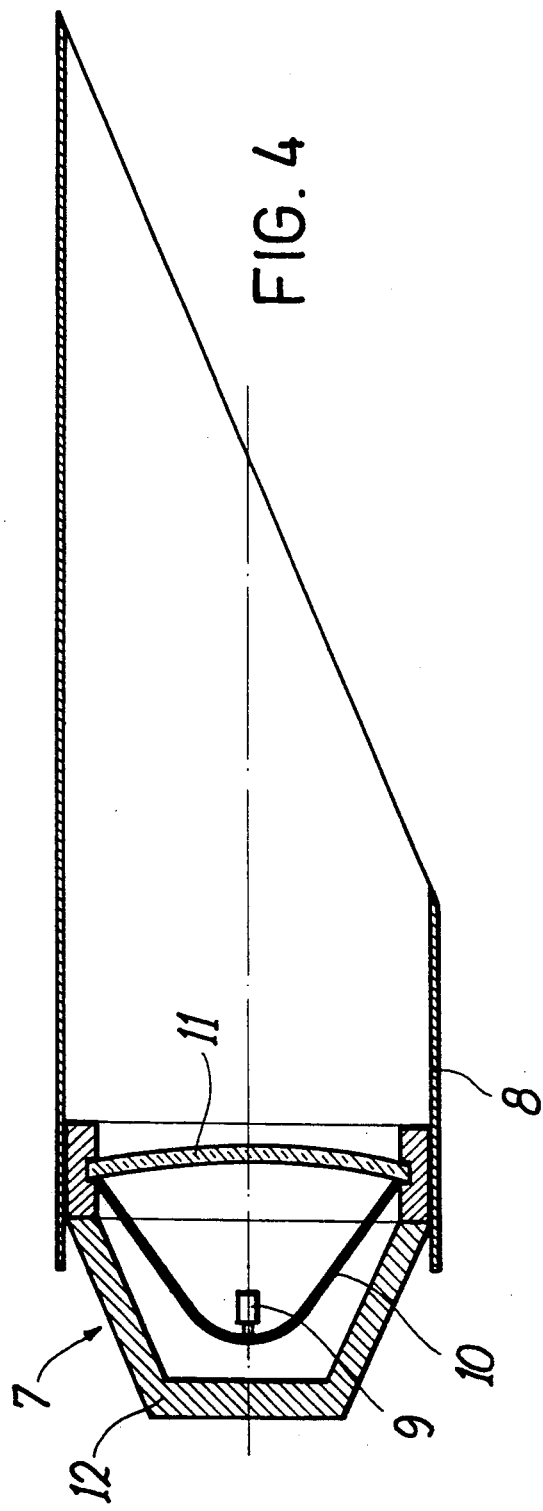
FIG. 4 shows the longitudinal cross-section of an embodiment of a fog light according to the invention, which is intended for being assembled off shape on the motor vehicle.

FIG. 4 shows schematically a cross-sectional view of an embodiment of the fog lights according to the invention, designed for being assembled on motor vehicles already in use, wherein the fog light 7 is assembled off profile. In that case, in order to obtain the zone not directly lit (which zone is shown by the numeral 5 in FIG. 2) the fog light 7 is provided with a shield 8. In the drawing, the shield 8 is shaped as an obliquely cut hollow cylinder. FIG. 2 also shows the lamp 9, the parabolic reflector 10, the glass 11 and the casing 12 of the fog light 7, which elements may be of the conventional type.

Figure 5:
FIG. 5 shows an alternate embodiment of the invention with the fog lights on top of the vehicle.
Figure 6:
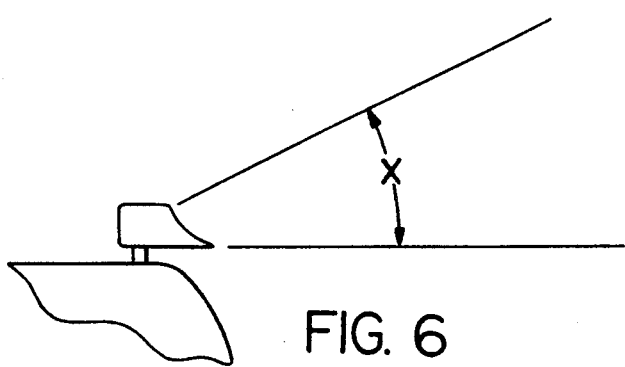
FIG. 6 shows a side view of that which is shown in FIG. 5 with the fog lights projecting beams forming an angle X.

FIGS. 5 and 6 show an alternate embodiment of the present invention wherein the fog lights are located on top of the vehicle. The fog lights are dimensioned so as to project the beam of light at an angle X. Angle X extends upwardly off from a first axis which extends parallel with the longitudinal axis of the vehicle and through a respective one of the fog lights. Angle X also lies within a plane that extends transversely off of the ground below the vehicle and has the first axis lying flush thereon. Preferably, angle X is from between 0° to 90° and more preferably between 0° to 45° or 0° to 60°. A projection of beams to 45° is suited for many applications. By directing the projected beams of light only upwardly from the level of the fog lights there is avoided the shining of light in the area immediately in front of the vehicle.

This invention has been disclosed with specific reference to some preferred embodiments thereof, but it is to be understood that modifications and/or changes could be brought in by those who are skilled in the art without departing from the true spirit and scope thereof. For example, both fog lights like that described above for attachment on or within the body sides of a vehicle and those positioned on top of the vehicle can be used in combination.

What is claimed is:

1. A front section of a motor vehicle comprising:
   first and second body sides and a front face portion extending between and inside of said body sides;
   a first group of headlights positioned closer to said first body side than to said second body side, said first group of headlights including at least one fog light;
   a second group of headlights positioned closer to said second body side than to said first body side, said second group of headlights including at least one fog light;
   said at least one fog light in said first group of headlights and said at least one fog light in said second group of headlights being dimensioned and arranged such that beams of light projected from said fog lights form, on a plane parallel to a ground surface below the vehicle and passing through said fog lights, angles comprised essentially between 0° and 90° which extend only outward with respect to an axis extending in the direction of a longitudinal axis of the vehicle, and said fog lights in said first and second groups being dimensioned and arranged so as to project light beams in a manner which maintains a central corridor that is not directly lit by said fog lights and which lies in front of the vehicle and which extends essentially between the first and second body sides of the vehicle.

2. A front section as recited in claim 1, wherein said fog lights are attached to outside portions of respective ones of said body sides.

3. A front section as recited in claim 1, wherein said fog lights are positioned within respective ones of said body sides.

4. A front section as recited in claim 1, wherein said fog lights are integrated within a shaped portion of the motor vehicle such that the shaped portion of the vehicle assists in maintaining the central corridor in front of the vehicle not directly illuminated by said fog lights.

5. A front section as recited in claim 4, wherein the vehicle includes front mud guards and said fog lights are provided within respective ones of said body sides at a position adjacent the front mud guards of the vehicle.

6. A front section as recited in claim 1, further comprising opaque tubular shields, and each of said fog lights being surrounded by one of said opaque tubular shields, and each of said shields having an axial length which is longer on an inside portion of said shield than on an outside portion of said shield so as to direct light outwardly and prevent light from being directed inwardly.

7. A front section as recited in claim 6, wherein said tubular shield is shaped as an obliquely cut cylinder.

8. A front section as recited in claim 1 wherein said fog lights are dimensioned and arranged such that said angles formed are comprised essentially between 0° to 60°.

9. A front section as recited in claim 1 wherein said fog lights are dimensioned and arranged such that said angles formed are comprised essentially between 0° to 45°.

10. A fog light to be supported by a motor vehicle, characterized in that it is surrounded by an opaque tubular shield whose axial length is maximum at a point and minimum at another point diametrically opposite, said shield being dimensioned and arranged so as to have the point of maximum axial length positioned further inward with respect to a central, longitudinal axis of the vehicle than the point of minimum axial length.

11. A fog light according to claim 10, wherein said tubular shield is shaped of an obliquely cut hollow cylinder.

12. A fog light as recited in claim 10 wherein said tubular shield is defined by a recessed section of the motor vehicle.

13. A method of illuminating a path of a vehicle having a front section that includes first and second body sides and a front face extending between and inside of said body sides with a first fog light being positioned closer to said first body side than said second body side and a second fog light positioned closer to said second body side than said first body side, comprising:

projecting a beam of light from said first fog light such that the beam of light is projected so as to form, on a plane extending parallel to a ground surface below the vehicle and axially bisecting said first fog light, an angle essentially between 0 and 90 degrees which extends essentially only out away from said vehicle with respect to a first axis extending essentially in the direction of a longitudinal axis of the vehicle and through said first fog light, and such that a portion of the beam of light extending off of said first fog light is essentially parallel to said first axis; and projecting a beam of light from said second fog light such that the beam of light is projected so as to form, on a plane extending parallel to a ground surface below the vehicle and axially bisecting said second fog light, an angle essentially between 0 and 90 degrees which extends essentially only out away from said vehicle with respect to a second axis extending essentially in the direction of the longitudinal axis of the vehicle and through said second fog light, and such that a portion of the beam of light extending off from said second fog light is essentially parallel to said second axis.

14. A front section of a motor vehicle having a first and second body side comprising:

a first fog light supported by said vehicle and positioned closer to said first body side than to said second body side;

a second fog light supported by said vehicle and positioned closer to said second body side than to said first body side;

said first fog light including means for projecting a beam of light, and said first fog light being dimensioned and arranged so as to only direct the beam of light within an angle which extends out away from the vehicle and which originates with a first axis that passes through said first fog light and runs essentially parallel with a longitudinal axis of the vehicle, and said first fog light being dimensioned and arranged such that a portion of the beam of light extending off of said first fog light is essentially parallel to said first axis; and said second light including means for projecting a beam of light, and said second fog light being dimensioned and arranged so as to only direct the beam of light within an angle which extends out away from the vehicle and which originates with a second axis that passes through said second fog light and runs essentially parallel with the longitudinal axis of the vehicle, and said second fog light being dimensioned and arranged such that a portion of the beam of light extending off of said second fog light is essentially parallel to said second axis whereby a central corridor in front of the vehicle is not directly illuminated by said first and second fog lights.

15. A front section as recited in claim 14, wherein said angles are comprised between 0° and 60°.

16. A front section as recited in claim 14, wherein said angles are comprised between 0° and 45°.

17. A front section as recited in claim 16 wherein said front section of said vehicle includes a roof section and said first and second fog lights are supported on said roof section such that the beam of light projected from each fog light is projected upwardly out away from said roof section.

18. A front section as recited in claim 16 wherein said first fog light is supported on the first side of said vehicle and said second fog light is supported on the second side of said vehicle such that said fog lights project beams of light out away from the sides of the vehicle.

19. A front section of a vehicle as recited in claim 18 wherein said fog lights are attached to respective body sides of the vehicle.

20. A front section as recited in claim 18 wherein said fog lights are mounted in recesses formed in respective sides of the vehicle.

21. A front section as recited in claim 16 wherein each of said fog lights includes an opaque tubular shield having a maximum axial length section diametrically opposed from a minimum axial length section.

22. A front section of a motor vehicle comprising:
first and second body sides and a front face portion extending between and inside of said body sides;
a first group of headlights positioned closer to said first body side than to said second body side, said first group of headlights including at least one fog light;
a second group of headlights positioned closer to said second body side than to said first body side, said second group of headlights including at least one fog light;
said at least one fog light in said first group of headlights and said at least one fog light in said second group of headlights being dimensioned and arranged such that beams of light projected from said fog lights form, on a plane parallel to a ground surface below the vehicle and passing through said fog lights, angles comprised essentially between 0° and 90° which extend only outward with respect to an axis extending in the direction of a longitudinal axis of the vehicle and wherein said fog lights are positioned within respective ones of said body sides.

23. A front section of a motor vehicle comprising:
first and second body sides and a front face portion extending between and inside of said body sides;
a first group of headlights positioned closer to said first body side than to said second body side, said first group of headlights including at least one fog light;
a second group of headlights positioned closer to said second body side than to said first body side, said second group of headlights including at least one fog light;
said at least one fog light in said first group of headlights and said at least one fog light in said second group of headlights being dimensioned and arranged such that beams of light projected from said fog lights form, on a plane parallel to a ground surface below the vehicle and passing through said fog lights, angles comprised essentially between 0° and 90° which extend only outward with respect to an axis extending in the direction of a longitudinal axis of the vehicle, and wherein said fog lights are integrated within a shaped portion of the motor vehicle such that the shaped portion of the vehicle assists in maintaining a central corridor in front of the vehicle not directly illuminated by said fog lights.

24. A front section of a motor vehicle comprising:
first and second body sides and a front face portion extending between and inside of said body sides;
a first group of headlights positioned closer to said first body side than to said second body side, said first group of headlights including at least one fog light which is positioned closer to said first side than another headlight of said first group;
a second group of headlights positioned closer to said second body side than to said first body side, said second group of headlights including at least one fog light which is positioned closer to said second body side than another headlight of said second group;
said at least one fog light in said first group of headlights and said at least one fog light in said second group of headlights being dimensioned and arranged such that beams of light projected from said fog lights form, on a plane parallel to a ground surface below the vehicle and passing through said fog lights, angles comprised essentially between 0° and 90° which extend only outward with respect to an axis extending in the direction of a longitudinal axis of the vehicle.

25. A front section of a motor vehicle having a first and a second body side comprising:
a first fog light supported by said vehicle and positioned closer to said first body side than to said second body side;
a second fog light supported by said vehicle and positioned closer to said second body side than to said first body side;
said first fog light including means for projecting a beam of light, and said first fog light being dimensioned and arranged so as to only direct the beam of light within an angle which extends out away from the vehicle and which originates with an axis that passes through said first fog light and runs essentially parallel with a longitudinal axis of the vehicle; and
said second fog light including means for projecting a beam of light, and said second fog light being dimensioned and arranged so as to only direct the beam of light within an angle which extends out away from the vehicle and which originates with an axis that passes through said second fog light and runs essentially parallel with the longitudinal axis of the vehicle, and wherein said first fog light is supported on the first side of said vehicle and said second fog light is supported on the second side of said vehicle such that said fog lights project beams of light out away from the sides of the vehicle.

* * * * *